No. 731,996. PATENTED JUNE 23, 1903.
R. EICKEMEYER, DEC'D.
R. EICKEMEYER, JR. & M. T. EICKEMEYER, EXECUTORS.
METHOD OF OPERATING ALTERNATING CURRENT ELECTRIC MOTORS.
APPLICATION FILED MAY 13, 1902.
NO MODEL. 4 SHEETS—SHEET 1.

WITNESSES.
J. Ellis Glenn.
Helen Alford.

INVENTOR
MARY T. EICKEMEYER,
AND RUDOLF EICKEMEYER JR.
EXECUTORS OF
RUDOLF EICKEMEYER,
DECEASED.
BY Albert G. Davis ATTY.

THE NORRIS PETERS CO., PHOTO-LITHO., WASHINGTON, D. C.

No. 731,996. PATENTED JUNE 23, 1903.
R. EICKEMEYER, DEC'D.
R. EICKEMEYER, JR. & M. T. EICKEMEYER, EXECUTORS.
METHOD OF OPERATING ALTERNATING CURRENT ELECTRIC MOTORS.
APPLICATION FILED MAY 13, 1902.
NO MODEL. 4 SHEETS—SHEET 2.

WITNESSES
J. Ellis Glenn
Helen Orford

INVENTOR.
MARY T. EICKEMEYER,
AND RUDOLF EICKEMEYER JR.
EXECUTORS OF
RUDOLF EICKEMEYER,
DECEASED
BY Albert G. Davis
ATTY.

No. 731,996. PATENTED JUNE 23, 1903.
R. EICKEMEYER, DEC'D.
R. EICKEMEYER, JR. & M. T. EICKEMEYER, EXECUTORS.
METHOD OF OPERATING ALTERNATING CURRENT ELECTRIC MOTORS.
APPLICATION FILED MAY 13, 1902.
NO MODEL. 4 SHEETS—SHEET 3.

WITNESSES.
J. Ellis Glenn.
Helen Orford.

INVENTOR.
MARY T. EICKEMEYER,
AND RUDOLF EICKEMEYER JR.
EXECUTORS OF
RUDOLF EICKEMEYER
DECEASED.
BY Albert G. Davis ATTY No. 731,996. PATENTED JUNE 23, 1903.
R. EICKEMEYER, DEC'D.
R. EICKEMEYER, JR. & M. T. EICKEMEYER, EXECUTORS.
METHOD OF OPERATING ALTERNATING CURRENT ELECTRIC MOTORS.
APPLICATION FILED MAY 13, 1902.
NO MODEL. 4 SHEETS—SHEET 4.

WITNESSES.
J. Ellis Glenn.
Helen Orford

INVENTOR.
MARY T. EICKEMEYER
AND RUDOLF EICKEMEYER JR.
EXECUTORS OF
RUDOLF EICKEMEYER
DECEASED
BY Albert G. Davis ATTY.

THE NORRIS PETERS CO., PHOTO-LITHO., WASHINGTON, D. C.

No. 731,996. Patented June 23, 1903.

UNITED STATES PATENT OFFICE.

RUDOLF EICKEMEYER, JR., AND MARY T. EICKEMEYER, OF YONKERS, NEW YORK, EXECUTORS OF RUDOLF EICKEMEYER, DECEASED.

METHOD OF OPERATING ALTERNATING-CURRENT ELECTRIC MOTORS.

SPECIFICATION forming part of Letters Patent No. 731,996, dated June 23, 1903.

Original application filed July 6, 1894, Serial No. 516,724. Divided and this application filed May 13, 1902. Serial No. 107,146. (No model.)

*To all whom it may concern:*

Be it known that RUDOLF EICKEMEYER, deceased, late of Yonkers, in the county of Westchester and State of New York, during his lifetime invented certain new and useful Improvements in Methods of Operating Alternating-Current Electric Motors, and that we, RUDOLF EICKEMEYER, Jr., and MARY T. EICKEMEYER, executors under the last will and testament of the said RUDOLF EICKEMEYER, do hereby declare to the best of our knowledge and belief that the following specification, taken in connection with the drawings furnished and forming a part of the same, is a clear, true, and complete description of said improvements.

This application is a division of application, Serial No. 516,724, filed July 6, 1894.

The present invention relates to motors adapted to use in electric circuits wherein the current alternates.

In application for patent filed September 23, 1891, Serial No. 406,574, were disclosed motors which were driven by currents of the character referred to, the current in each instance operating in a set of field-coils and inducing a secondary current in a separate set of short-circuited field-coils, the latter being unsymmetrically located with relation to the coils to which the main exciting-current is supplied. In some of the said motors the armature-circuits were directly supplied with current and in others the armature-circuits were closed upon themselves and supplied solely by currents induced therein by the alternating field magnetism.

It has now been discovered that the alternating current can be made to initially operate motors having induction-armatures in which only closed circuits are employed and to which no outside currents are supplied by varying the flow of the current in all or in portions of the field-coils by means of an appropriate electric starting-switch, and thereby the armature caused to commence its rotation and with sufficient torque to overcome such load as the motor may be intended to carry.

The armatures of the motors in their preferred forms embody iron cores with tightly-inserted longitudinal copper conductors and copper heads and are novel in that said parts are so organized and united by soldering as to constitute a substantially integral solid structure and afford the desired number of closed circuits, which are traversed by currents induced by the rotation of the armature through and by the alternations of the magnetic field. In armatures of this type in their best form the longitudinal conductors are annularly arranged and in one or more concentric rows so disposed in the iron core as to separate parts of it into sections divided substantially on radial lines extending from the periphery inwardly. The motor is also novel in having the field-poles and the longitudinal conductors unsymmetrical with relation to each other, so that no two magnet-poles can ever have a magnetic circuit (through portions of the core) which is precisely the same as that of any other two poles and also in having the plugs (or longitudinal conductors) and poles located unsymmetrically, so that no two adjacent plugs will occupy the same position with relation to their adjacent pole or poles as any other two similar plugs will occupy with relation to their adjacent pole or poles, the object being by these several features of construction to reduce the magnetic resistance of the armature to the lowest practicable degree and for affording specially ample magnetic circuits and numerous closed circuits in the armature-core. The plugs are arranged in concentric rows, so that the plugs in some of the rows will occupy different radial lines from those occupied by the other plugs.

In the drawings annexed to this specification.

The machine A (shown in Figs. 1 and 2) has a field-magnet A', which contains sixteen field-coils $a$ on a ring or core composed of soft-iron plates $b$, the latter being laterally bored to receive the inner ends of the coil, which are otherwise maintained in position by wedge-shaped blocks $c$, interposed between the coils at their sides and outer ends, the blocks and core-plates being clamped together by means of pins or bolts $d$. The bored holes in the core are slitted through to the armature-space, as at $b'$, for affording air-space between the pole-divisions or pole-faces of the field-magnets, of which there are sixteen, intervening between the sixteen coils.

Figure 1:
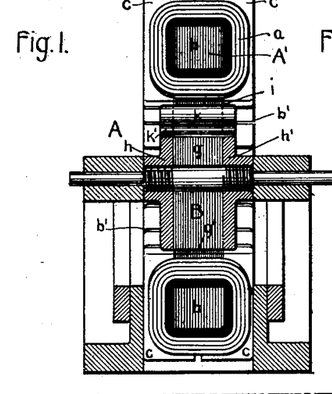
Figures 1 and 2 illustrate in two diametrically opposite sections the general construction of one form of alternating-current machines in connection with which the present invention may be practiced.
Figure 2:
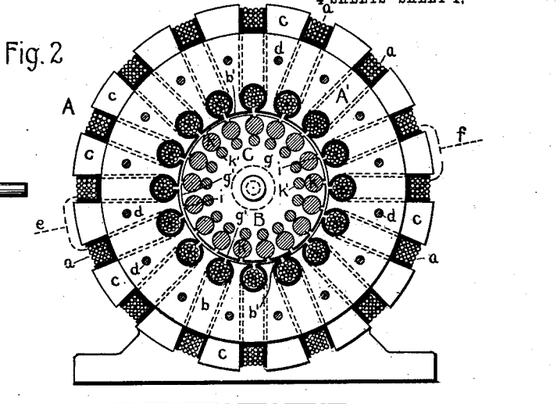

The armature B includes a core $g$, of soft-iron disks, clamped between two copper heads $h\ h'$. Near the periphery of the drum thus formed it is bored in the line of its axis at seventeen equidistant points, and the metal is also slitted, as at $i$, through the outer side of each hole, thus dividing the face of the armature into seventeen divisions, with intervening air-spaces. Into these holes soft-copper plugs $k$ are tightly inserted. Concentric with these outer holes a corresponding number of smaller holes are bored, each slightly opening into the adjacent large hole. Into these small holes soft-copper plugs $k'$ or pins are fitted, each pair of small and large plugs being in contact with each other and serving in substance as one conductor of such a form as will possess desirable sectional area without unduly reducing the bulk of iron between each pair of the thus-connected conductors, this iron being required for affording magnetic circuits. The copper heads $h\ h'$ and the several plugs or pins $k\ k'$ are then united by solder at all the joints, thus producing an armature which is a practically solid integral structure and one which cannot become injured or impaired by service, and hence need never be dismantled.

Referring to Fig. 2, it will be seen that the magnetic circuit from no one field-pole through the adjacent iron in the armature-core to any other field-pole can ever be precisely the same (in magnetic conductivity) as any other magnetic circuit between any other two field-poles, because of the unsymmetrical relations between said field-poles and the divisions of the iron-core near its periphery.

Figure 3:
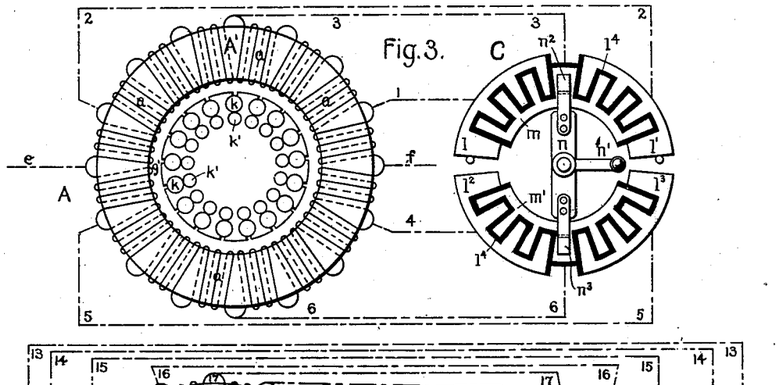
Fig. 3 is a plan view of one of the reversible motor-starting switches and its electrical connections with motor, the latter being bipolar, as in Figs. 1 and 2, but with its field illustrated diagrammatically and the supply-wire terminals having no connection with the switch.

As already stated, a motor of this type will be driven efficiently after it has been once started. In order that the motor may be started electrically, the method and means herein desclosed have been devised. By this method the motor is started electrically by the manipulation of what will be called a "terminal" rotating or motor-starting switch, which has been devised in different forms, in the operation of some of which the feeding-current connections with field remain unchanged, but the field-poles are in substance rotated, because of an intermitting short-circuiting of appropriate portions of the field-coils, whereby the flow of magnetism in the magnetic circuits of the field is so shifted, changed, or varied as to cause the initial and powerful rotation of the armature. A motor-starting switch of this kind is shown in Fig. 3 at C, the motor-field A', with its sixteen coils $a$, being in closed electric circuit and having the feeding-wire terminals $e$ and $f$ at two opposite points. In this switch C there are six annularly-arranged segmental contact blocks or plates; but these are united in opposite groups of three plates each—$l$, $m$, and $l'$ and $l^2$, $m'$, and $l^3$—the plates of each group being in one plane and toothed somewhat like the teeth of an internal gear and an ordinary gear meshed together, but separated at all points by a line of insulating material $l^4$. A brush-arm $n$, centrally pivoted and provided with a hand-crank $n'$, has at each end a brush or contact-plate $n^2$ or $n^3$, each being a little wider than the zigzag line $l^4$ of insulating matter, so that as the switch-arm is moved to and fro each brush intermittingly laps upon the two underlying plates and then on only one of them, but alternating in this complete contact with the several plates, the object being to intermittingly short-circuit portions of the field-coils and to thereby in substance so rotate the field-poles or at least to so shift, change, or vary the flow of magnetism in the field magnetic circuits as to cause the armature to start its rotation in a direction according to the direction in which the switch-arm $n$ is moved, as will be hereinafter specially described. The connection of the switch blocks or plates with the field-coils is as follows: The plate $l$ by wire 1 is coupled to the field-coils near the one side of the supply-terminal $f$, the plate $l'$ is coupled by wire 2 with the coil-sections at the upper side of the supply-terminal $e$, and the plate $m$ is coupled by wire 3 with the coil-sections at a point midway of the connections made at the coil by wires 1 and 2 from the plates $l$ and $l'$. The plate $l^2$ is coupled to the coil near and at the opposite side of the terminal $f$ by wire 4, plate $l^3$ is coupled by wire 5 to the coils near and at the side of the terminal $e$, and the plate $m'$ is coupled by wire 6 to the coils at a point located equally between the connections with plates $l^2$ and $l^3$ by their wires 4 and 5. It will now be seen if the switch-bar $n$ should be quickly swung from the position of rest shown, so that its brushes or contacts would pass over plates $m$ and $l'$ and $m'$ and $l^2$, that the sections of field-coil between the connection with wires 2 and 3 and also those sections between wires 4 and 6 will be rapidly and intermittingly short-circuited, and as there are seven insulated lines $l^4$ to bridge, these sections of coils are short-circuited and restored to circuit seven times. This will cause the armature to start and be revolved in one direction. If the motor is to be started and driven in the opposite direction, the brushes being in the position shown on the figure, the brush-arm is swung so as to sweep over plates $m$ and $l$ on one side and plates $m'$ and $l^3$ on the other, in which case the coil-section between the connections with wires 1 and 3 will be intermittingly short-circuited on one side and also the sections between the connections with wires 6 and 5 on the other side. When the motor has once been started in either direction and the switch-arm then resting at its ends either on the plates $l'$ and $l^2$ or $l$ and $l^3$, none of the sections are short-circuited and all are traversed by the main current.

Considering the machine to have been started and in full operation, it is to be understood that the revolution of the armature through the magnet-field induces an electric current in the several armature-conductors, (as in any dynamo,) and this induced current in this machine has the same phase as the alternating field magnetism and magnetizes the adjacent portions of the armature in a direction perpendicular (or at right angles) to the direction of the field magnetism, and this induced current is always proportional to the speed of the armature.

By the alternations of the field magnetism there is induced in the armature another current, which lags behind the field magnetism one-quarter of a period and magnetizes the armature in the same direction as the field. This latter current is independent of the revolution of the armature and is due to so-called "mutual induction." These two currents thus circulating in the conductors of the revolving armature differ in phase by one-quarter of a period and magnetize in directions which are perpendicular to each other, and therefore they cause one or more groups or sets (according to whether used in a bipolar or multipolar machine) of rotating magnet-poles in the armature, which by their attraction and repulsion of the alternating field-poles cause rotation of the armature. The one of these currents which is due wholly to rotation of the armature cannot of course be developed when the armature is at rest, and it is only when the armature is in motion that there is any rotation of the magnet-poles in the armature, and the rotation of these poles only reaches uniform strength and speed when the armature approaches synchronism with the alternating current. For these reasons motor-starting devices must be employed, and when said devices are purely mechanical their mode of operation will be obvious; but when electrical powers are invoked in connection with a starting device the latter must be capable of setting up conditions more or less closely corresponding to the electrical conditions attending the armature when it is under full operation. It must be understood, however, that the description of the varied electrical and magnetic conditions involved in the operation of these machines is not intended to be more than a general outline, the action being somewhat more complex than indicated. At all events by working the switch already described, and thereby intermittingly short-circuiting portions of the field-coils which, as shown, are unsymmetrically located with reference to the connections of the field with the main or supply-wire terminals, electrical and magnetic conditions are produced in the armature which so far resemble those present while it is in motion as to cause it to commence rotation.

With the novel combination of a field having a well-defined number of pole-faces and an armature having no well-defined pole-faces, but approximately equal magnetic resistance in all directions and closed-circuit conductors, and the latter being numerous and having no large common divisor with the number of field-poles, (and as a rule greater in number than the number of poles in the field,) ease and promptness in starting the motor are secured by merely initiating its rotation by shifting or varying the electrical connections by which the field is supplied, and thereby shifting, changing, or varying the magnetic flow in the magnetic circuits in the field.

Figure 4:
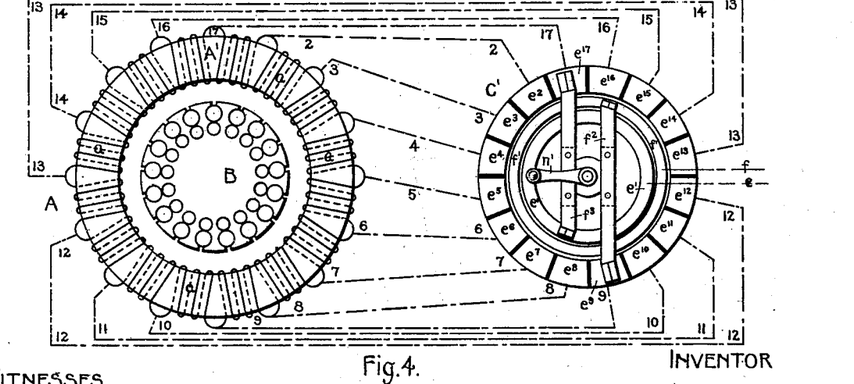
Fig. 4 is a plan view of another of the motor-starting switches and of the motor as in Fig. 3, but with the supply-wire terminals connected to the switch.

For producing the electrical and magnetic conditions in and around the stationary armature which are present when the armature is in motion, so as to cause initial rotation of the armature, other means have been devised and applied to the motor-switch by which the terminal connections of the feeding or supply wires with the field are rotated concentrically with the armature. This organization is illustrated in Fig. 4, wherein the switch $C'$ is an intermediary between the line-wire or supply conductors $e$ and $f$, each being connected with its appropriate ring-plate $e'$ and $f'$, the two plates being concentric to each other and both being centrally located within a series of annularly-arranged contact blocks or plates, of which there are sixteen, (designated, progressively, from $e^2$ to $e^{17}$.) Two brushes $f^2$ and $f^3$ are coupled together and axially mounted at the center of the switch and provided with a hand-crank $n'$, so that they may be readily and rapidly operated in continuous successive rotations. The brush $f^2$ at one end rests upon the supply-terminal plate $f'$, and at the other end it bears upon and can sweep over all of the blocks $e^2$ to $e^{17}$. The brush $f^3$ in like manner at its outer end engages with said blocks, and at its inner end it bears upon the annular terminal plate $e'$.

Figure 5:
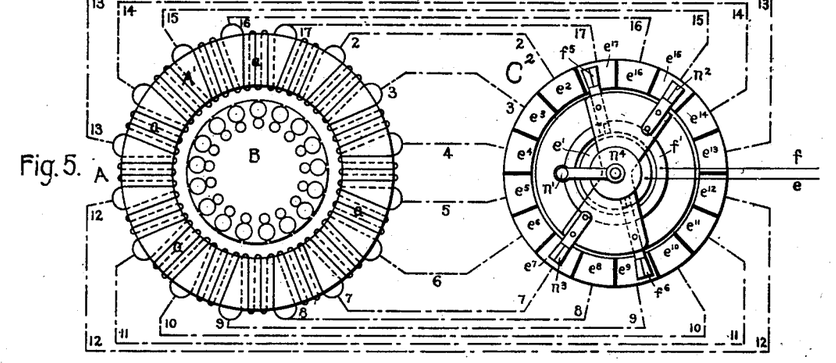
Fig. 5 in a similar manner illustrates the motor and still another of the motor-starting switches, this latter embodying the characteristic features of both of the switches, Figs. 3 and 4.

The motor A, its field-magnet A', and armature B are as before described; but in this case the wire connection between each two of the sixteen coils $a$ is coupled to an appropriate contact-block of the switch by wires which are designated by numerals which correspond with the numeral of each block—as, for instance, by wire 2 from block $e^2$, by wire 3 from block $e^3$, and so on throughout the series. As here shown, the motor is coupled to operate as a bipolar machine, the current entering and leaving by supply-terminals which are always diametrically opposite each other—as, for instance, with the switch bars or brushes in the position shown the supply connections with the field-coils are from $e$ to $e'$, to brush $f^3$, contact-block $e^{17}$, by wire 17 to one side of the annular field, where it divides, passes in both directions to the opposite side, and thence by wire 9 to switch-block $e^9$, to brush $f^2$, and thence to the ring-plate $f'$ and out on supply-terminal $f$. It will now be obvious that when the switch-brushes are rotated the terminal connections are also rotatively shifted progressively and in regular succession, and thus rotate the field, and that this action with respect to the armature and its closed-circuit conductors causes induced currents in the latter, which so far resemble the induced currents therein, which are caused by the rotation of the armature, that the latter will start from its position of rest and with torque corresponding to the speed at which the switch may be rotated, the armature revolving in a direction opposite to that in which the field is rotated. When the motor has been thus started, the motion of the armature thereafter produces induced currents, which afford the magnetic reaction necessary for its continued rotation, and hence the rotation of the switch (or field) is no longer required. Both of these starting-switches are shown combined in the organization Fig. 5, wherein the motor A, its field A', and armature B are as before described. The sixteen field-coils $a$ are connected with this switch $C^2$ by wires 2 3 4, &c., with appropriate switch-blocks $e^2$ $e^3$ $e^4$, &c., and ring-plates $e'$ and $f'$ are connected with the terminals of supply-wires $e$ and $f$, as before described in connection with switch $C'$. In this case, however, four brushes are employed, and these are carried on a suitable carrier $n^4$, axially mounted and having a hand-crank $n'$. Of these four brushes those at $n^2$ and $n^3$ are for short-circuiting, while the brushes $f^5$ and $f^6$, respectively, couple the supply-ring plates $f'$ and $e'$ with the several blocks $e^2$ $e^3$, &c., and thereby revolve the field-terminals. With the brushes standing in the position shown (or as they should be when at rest) the current enters through main supply-wire $e$ to ring $e'$ and by way of the brush $f^6$ passes to block $e^9$, thence by wire 9 to the field, where it divides, passing in both directions around to the opposite side of the field, and emerges at the terminal of wire 17, thence to block $e^{17}$, and brush $f^5$ to ring $f'$, and out on supply-wire $f$. When the brushes $n^2$ and $n^3$ overlap any two contact-blocks, they short-circuit the sections which in each instance unsymmetrically intervene between the corresponding four-coil terminals. This starting-switch is organized for coöperating with a non-reversible motor.

Figure 6:
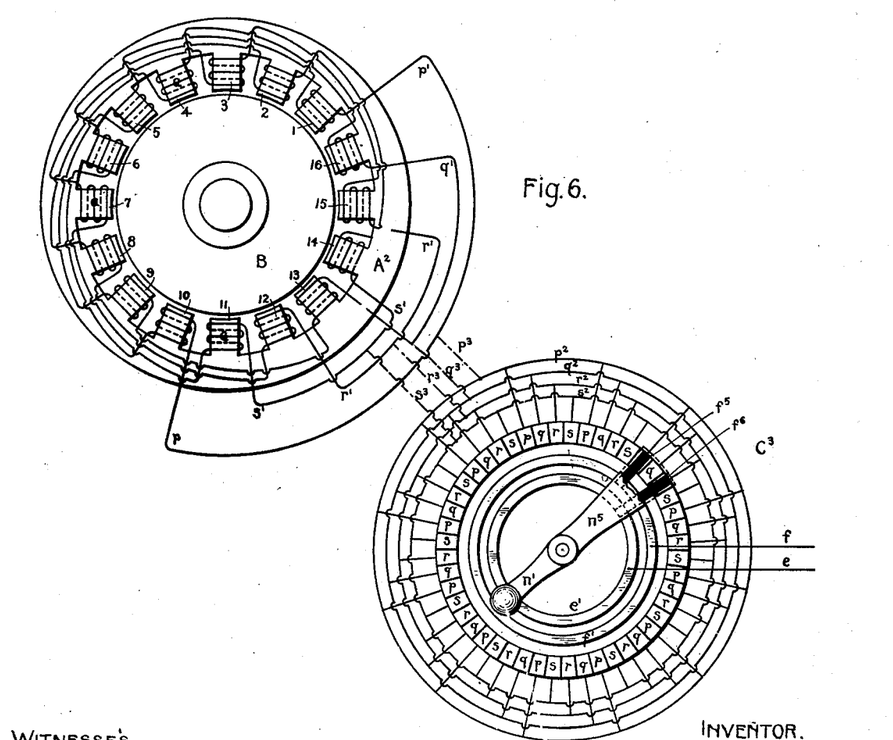
Fig. 6 illustrates in plan view one of the reversible motor-starting switches and its connection with a multipolar (four-pole) motor.

As thus far described the motors and their starting-switches have been of the bipolar type; but the application of the starting-switch to a multipolar organization is shown in Fig. 6, wherein an eight-pole motor-field $A^2$ and armature B, with a reversible starting-switch $C^3$, is shown with the several appropriate electric connections. In this motor-field there are sixteen cores or polar projections, respectively designated by numerals 1 to 16 and each having its appropriate field-coil or coil-section $a$ designated. The coil connections are grouped in fours, joined in series and in closed circuit, as in multipolar Gramme machines. In other words, coils $a$ at 1, 5, 9, and 13 are in one connected group, those at 14, 2, 6, and 10 in another, and so on throughout the sixteen coils. At the one side of the machine four of the outside connections between appropriate coils are graphically displayed in Fig. 6 at one side at $p'$, $q'$, $r'$, and $s'$, these being terminal wires of the four groups of coils.

The starting-switch $C^3$ has interior circular contact-plates $e'$ and $f'$, to which the supply-wire terminals $e$ and $f$ are connected. In an outer concentric circle there are forty-eight contact-blocks. A switch-arm $n^5$ is provided with a hand-crank $n'$ and carries two brushes $f^5$ and $f^6$, which are separated by a space a little greater than the length of a contact-block, (on the circular line,) and they respectively connect the several blocks with the supply-terminal contact-plates $f'$ and $e'$. The contact-blocks are connected in fours ($p$ with $p$, $q$ with $q$, $r$ with $r$, and $s$ with $s$) throughout the series by means of outside annular and radial conductors $p^2$, $q^2$, $r^2$, and $s^2$, and each of said annular conductors is connected by a wire with its appropriate set of coils, as follows: The several contact-blocks $p$ connect with the radial and annular conductor $p^2$, and this in turn connects with the connecting-wire $p^3$, which couples with the terminals of appropriate coils, and so also do the blocks $q$, $r$, and $s$, the arrangement being such that when excited each two adjacent coils are similarly magnetized—as, for instance, at coils 1 2 and 5 6 and 9 10 and 13 14 there will be an N polarity and at the intervening pairs an S polarity. Now by rotating this switch-bar in one direction when the armature is at rest there will result a reversing first of one half and then of the other half of the coils in alternation, as will cause such a rotation of the field-terminals as will start the motor in one direction, while for effecting a reversal of the motor the switch has only to be revolved in an opposite direction. While the motor is at full speed, it may be checked or even stopped if the starting-switch should be rotated at sufficiently high speed.

It will be readily seen that the starting-switches need not always be of an annular form, it being obvious that any one of the switches shown may be so adapted that its brush or brushes may slide and operate in a straight line, the contact-blocks being then arranged in one or more parallel rows and appropriately connected with the field-coils. This straight-line arrangement is well adapted to the simple form of hand starting-switch C; but in those switches which require rapid, continuous, and repeatedly-successive contact of the brushes the annular arrangement seems to be preferable.

As thus far described the starting-switches have been connected with coils to which the main exciting-current is supplied; but it is to be understood that the means for carrying out the present method is not restricted to the combination of a starting-switch with field-coils which are traversed by the main current, inasmuch as separate coils in which current is induced from the field may be employed with sole reference to the performance of motor-starting duty when properly controlled by means of an appropriate motor-starting switch. It will be observed in connection with the method of electrically starting alternating-current motors having closed circuit-armatures and multipolar fields that separate portions of the field are alternately and variably controlled. The valuable results of this mode of operation led to the devising of a novel method of operating and controlling multipolar dynamos, which, broadly stated, consists in a peculiar and novel method of varying the polar organization, which can be done while the machine is at rest or in operation—as, for instance, any machine adapted to operate as a sixteen, eight, or four pole machine may be capable of performing its normal duty when operated as an eight-pole machine; but it may also be successfully operated as a four-pole machine at double speed if more duty is required than normal, or if less duty be required it may then be operated slowly as a sixteen-pole machine. Such machines can be controlled by hand or by a mechanical regulator, which, according to variations in speed due to variations in load, will be capable of changing the machine from its eight-polar condition to a four-pole or to a sixteen-pole machine and back again to either of its other conditions. It is in connection with an organization of this type that the independent starting-coils hereinbefore referred to have been illustrated, (see Figs. 7, 8, and 9;) but since the present invention relates only to the method of starting the motor no attempt will be made to describe the operation of the pole-changing switch.

Figures 7, 8, 9:
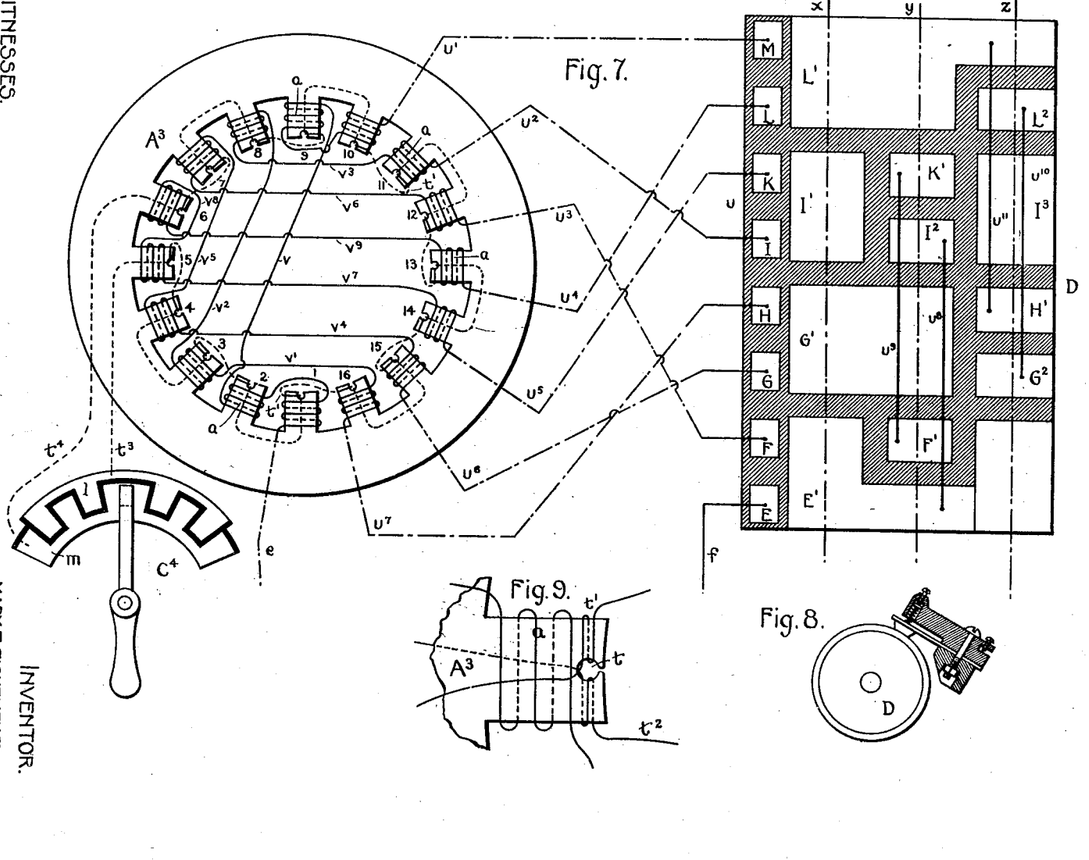
Fig. 7 illustrates one of the motor-starting switches and its connection with special motor-starting coils in a motor-field containing sixteen pole-faces and a pole-governing switch, shown in plane projection, by means of which the motor can at any and all times be changed at will or by a mechanical governor from a four to an eight or to a sixteen pole machine.
Fig. 8 is an end view of the pole-governing switch.
Fig. 9, upon an enlarged scale, illustrates one of the pole-faces of the motor with its exciting-coil and its two special starting-coils as arranged in a reversible motor.

In Fig. 7 only the field with its magnetic metal, its coils $a$, and the governing-pole switch D are shown. The annular field metal at $A^3$ is composed of plates of soft iron, and it is internally recessed to afford sixteen polar projections, respectively numbered from 1 to 16, and each is surrounded by its appropriate field-coil $a$. Each polar projection is perforated near its end from side to side of the field, as specially shown in Fig. 9 at $t$, for the reception of the sides of two sets of starting-coils $t'$ and $t^2$. Only one set of these coils is shown in Fig. 7, this being sufficient for starting the motor in one direction, the double arrangement being required for reversible motors. The several coils $t'$, as shown in Fig. 7, are connected in series in a circuit having its terminals $t^3$ $t^4$ connected with two switch-plates $l$ and $m$ of the starting-switch $C^4$, which resembles the switch C, already described, in the zigzag construction and arrangement of its contact-plates, which are swept by a brush on a pivoted arm, as in said other switch, so that as the brush is swung from one side to the other the starting-coil circuit is repeatedly closed and opened, there being several separating-lines between the plates in the path of the brush. A reversible starting-switch for use with the two sets of starting-coils $t'$ and $t^2$ will only involve the duplication of the plates $l$ and $m$ and their location within the path of the brush suitably enlarged and appropriate connections with the second set of starting-coils.

Figure 10:
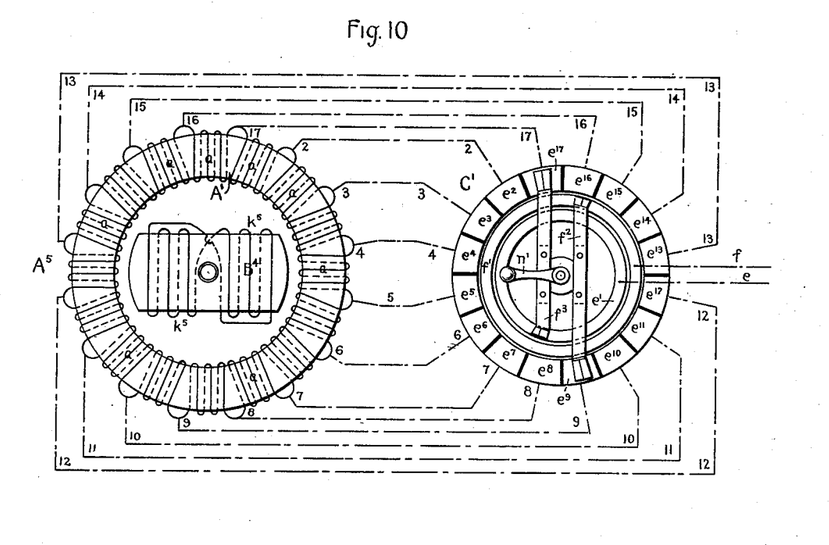
Fig. 10 illustrates a motor-starting switch and connections to the motor-windings the same as in Fig. 4, the motor in this case being shown with a bipolar shuttle-armature having a closed-circuit winding.
Figure 11:
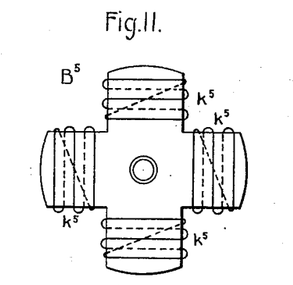
Fig. 11 illustrates a four-pole closed-circuit armature.
Figure 12:
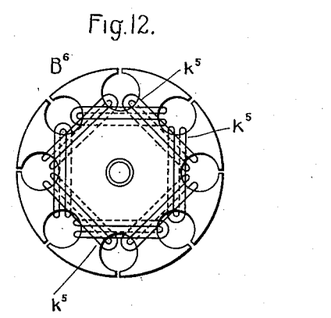
Fig. 12 illustrates another form of closed-circuit multipolar armature.

The method herein disclosed, as hereinbefore indicated, is not restricted to the starting of machines having armatures or induced elements which are of uniform magnetic resistance in all directions, because it is equally effective in connection with machines in which the armature has magnetic and electric circuits which are well defined and correspond in number to the number of field or inducing poles—as, for instance, as illustrated in Figs. 10, 11, and 12. In this motor $A^5$ the field $A'$, its coils $a$, and the starting-switch $C'$, with their several electrical connections 1 2 3, &c., are precisely as in Fig. 4. This armature $B^4$ is, however, of the bipolar shuttle type, its two arms being provided with appropriately-wound closed circuited coils or conductors $k^5$.

If instead of the bipolar armature the four-pole armature $B^5$ of Fig. 11 should be employed in the same field, correspondingly satisfactory results will accrue, this armature having four arms each having appropriately-wound closed circuited conductors $k^5$. A specially-desirable multipolar armature $B^6$ of this general type is shown in Fig. 12, wherein the closed-circuit conductors $k^5$ are wound within holes which are lengthwise in the armature-core and are cut through at the periphery thereof, as clearly indicated.

Machines embodying armatures of this kind, but otherwise corresponding with those already described, may be promptly started under load by means of their terminal rotating starting-switch.

Although several different arrangements of apparatus in connection with which the present invention may be practiced are shown herein, it will of course be understood that other apparatus may be devised embodying this same method, and the claims hereto annexed are intended to cover the method specified therein whatever may be the character of the apparatus used in carrying it out.

What is claimed as new, and desired to be secured by Letters Patent of the United States, is—

1. The method of converting electric energy into mechanical motion, substantially as hereinbefore described, the same consisting in the direct excitation by a single alternating current, of a series of magnetic circuits in one element of an electric motor; then inducing from said magnetic circuits a current in a series of closed electric circuits in the other element of the motor, and then causing the initial motion of one of said elements by mechanically shifting the terminals of the directly-excited circuits, and thereby changing or varying the flow of magnetism in the directly-excited magnetic circuits in the matter of position, strength, and direction, and thereafter ceasing said shifting action and enabling the driven element to continue its motion.

2. The method, substantially as hereinbefore described, of initially producing motion from alternating electric currents by the temporary mechanical revolution of the supply-circuit terminals of, or connections with, the field-magnet system, for substantially rotating the field and thereby inducing currents in the closed circuits of an armature which cause its initial rotation with effective torque, and by said rotation causing the induced currents in the armature-circuits which are essential for maintaining rotation.

3. The method of operating alternating-current motors, substantially as hereinbefore described, which consists in inducing magnetism in a series of magnetic circuits in one of the elements of a motor from a single alternating current supplied from outside sources; then from the magnetic circuits in the first element, inducing currents in a series of closed electric circuits in the second or other element of the motor, wherein the magnetic circuits are of practically uniform magnetic resistance, and then initially driving said second element by mechanically shifting, changing, or varying the flow of magnetism in the magnetic circuits of the first element, independently of the movement of the second element.

4. The method of starting and operating motors for alternating currents, which consists in producing induced currents in the closed circuits of a rotative armature while at rest by shifting the field connections for rotating the field and thereby enabling the armature to initially rotate, and then ceasing said field rotation, for enabling the armature to be thereafter rotated by the magnetic reaction incident to the movement of the armature.

5. The method of producing an initial starting torque in single-phase alternating-current induction-motors, which consists in causing a rotation in space of an alternating magnetomotive force and acting upon the induced member of the motor by said magnetomotive force.

6. The method of producing an initial starting torque in single-phase alternating-current induction-motors, which consists in partially suppressing one of the two rotary components of the impressed alternating magnetomotive force and acting by means of the other rotary component to produce rotation of the induced member of the motor.

7. The method of starting a single-phase alternating-current motor from a state of rest, which consists in impressing on the induced member of the motor an alternating magnetomotive force and partially suppressing one of the two rotary components of said magnetomotive force, thereby causing a starting torque due to the action of the other rotary component.

8. The method of starting a single-phase induction-motor from a state of rest, which consists in first impressing on the induced member a single-phase alternating magnetomotive force thereby producing two equal and opposite torques due to the action of the oppositely-rotating components of said alternating magnetomotive force, then increasing the torque due to one of said components and decreasing the torque due to the other component, thus disturbing the balance between the torques exerted between the two members of the motor and so creating an initial starting torque.

9. The method of producing an inital starting torque between the relatively motionless inducing and induced members of a single-phase alternating-current induction-motor, which consists in impressing on the induced member an alternating magnetomotive force and then causing a relative displacement between the induced member and the polar line of said magnetomotive force.

10. The method of producing an initial starting torque between the relatively motionless inducing and induced members of a single-phase alternating-current induction-motor, which consists in impressing on the induced member an alternating magnetomotive force, inducing currents by the action of said magnetomotive force, and causing the polar line due to said currents to be angularly displaced with respect to the polar line due to said magnetomotive force.

11. The method of producing a starting torque in a single-phase alternating-current induction-motor independently of any relative motion between the inducing and induced members of the motor, which consists in impressing an alternating magnetomotive force on the induced member and causing the polar line due to currents developed in the induced member to be displaced in position with respect to the polar line due to the impressed magnetomotive force.

12. The method of producing a starting torque in a single-phase alternating-current induction-motor independently of any relative motion between the inducing and induced members of the motor, which consists in impressing an alternating magnetomotive force on the induced member and partially suppressing one of the two oppositely-rotating components of said magnetomotive force.

13. The method of starting and operating motors for alternating and similar currents, by mechanically rotating the magnetic field at starting, thereby in conjunction with the said currents causing rotation of the armature, and thereafter discontinuing such mechanical rotation and permitting the motor to run as an alternating-current motor.

In witness whereof we have hereunto set our hands this 10th day of May, 1902.

RUDOLF EICKEMEYER, JR.,
MARY T. EICKEMEYER,
*Executors of Rudolf Eickemeyer, deceased.*

Witnesses to the signature of Rudolf Eickemeyer, Jr.:
LOUIS R. TAYLOR,
ARTHUR A. BUCK.

Witnesses to the signature of Mary T. Eickemeyer:
GEO. EICKEMEYER,
THOMAS W. IVERS.